(12) United States Patent
Wong

(10) Patent No.: US 9,980,594 B2
(45) Date of Patent: May 29, 2018

(54) GARLIC PRESS

(71) Applicant: Abdoolally Ebrahim Housewares Limited, Hong Kong (HK)

(72) Inventor: Wai Hang Wong, Hong Kong (HK)

(73) Assignee: Abdoolally Ebrahim Housewares Ltd., Kowloon (HK)

( * ) Notice: Subject to any disclaimer, the term of this patent is extended or adjusted under 35 U.S.C. 154(b) by 0 days. days.

(21) Appl. No.: 15/008,782

(22) Filed: Jan. 28, 2016

(65) Prior Publication Data

US 2016/0220056 A1    Aug. 4, 2016

Related U.S. Application Data

(60) Provisional application No. 62/110,162, filed on Jan. 30, 2015.

(51) Int. Cl.
*A47J 19/06* (2006.01)
*B30B 9/06* (2006.01)
*A47J 19/04* (2006.01)

(52) U.S. Cl.
CPC .............. *A47J 19/06* (2013.01); *A47J 19/04* (2013.01); *B30B 9/06* (2013.01)

(58) Field of Classification Search
CPC ........ A47J 19/022; A47J 19/04; A47J 19/005; A47J 19/06; B30B 9/06; B30B 9/08; B30B 7/00
USPC ................ 100/234, 243, 116, 126, 112, 110; 241/169, 169.2; 99/495, 510
See application file for complete search history.

(56) References Cited

U.S. PATENT DOCUMENTS

| | | | | |
|---|---|---|---|---|
| 1,959,615 A | * | 5/1934 | Derrah | A47J 19/022 100/125 |
| 5,101,720 A | * | 4/1992 | Bianchi | A47J 19/06 100/112 |
| 5,463,941 A | * | 11/1995 | Gibson | A47J 19/06 100/112 |
| 6,974,098 B2 | * | 12/2005 | Keller | A47J 19/06 100/112 |
| 8,534,190 B2 | * | 9/2013 | Ericsson | A47J 19/06 100/112 |
| 2004/0134362 A1 | * | 7/2004 | Harrison-Griffin | A47J 19/06 100/234 |
| 2007/0181012 A1 | * | 8/2007 | Chapman | A47J 19/06 100/234 |
| 2011/0049276 A1 | * | 3/2011 | Miller | A47J 19/06 241/27 |

FOREIGN PATENT DOCUMENTS

| | | | | |
|---|---|---|---|---|
| DE | 1255878 B | * | 12/1967 | A47J 19/06 |
| DE | 102007020500 A1 | * | 2/2009 | A47J 19/04 |

OTHER PUBLICATIONS

Abdoolally Ebrahim Housewares Limited, Garlic Press—Design B, Apr. 2012, 1 page, presented in Hong Kong at Housewares Fair.

* cited by examiner

*Primary Examiner* — Jimmy T Nguyen
(74) *Attorney, Agent, or Firm* — Schacht Law Office, Inc.; Dwayne Rogge

(57) ABSTRACT

Described herein is a garlic press which includes a pair of handles joined together at a pivot point so that the handles may be rotated apart and towards each other. A first (piston) handle includes a hopper for receiving a garlic clove to be pressed, while the opposing second (hopper) handle is formed with a complementary piston that is sized and configured to be forced into the cavity to crush the clove of garlic.

4 Claims, 8 Drawing Sheets

GARLIC PRESS

RELATED APPLICATIONS

This application claims priority benefit of U.S. Provisional Patent Application Ser. No. 62/110,162 filed Jan. 30, 2015, incorporated herein by reference.

BACKGROUND OF THE DISCLOSURE

Field of the Disclosure

This disclosure relates to the field of devices to crush items through a perforated plate and retain the crushed portion of the item. The device is particularly well suited to the crushing of garlic for food preparation.

BRIEF SUMMARY OF THE DISCLOSURE

Disclosed herein is a garlic press which includes a pair of handles joined together at a pivot point so that the handles may be rotated apart and towards each other. A first (piston) handle includes a hopper for receiving a garlic clove to be pressed, while the opposing second (hopper) handle is formed with a complementary piston that is sized and configured to be forced into the cavity to crush the clove of garlic.

In one example of the disclosed apparatus, the cavity includes a lower surface formed with a plurality of projections (protrusions) while the piston includes a mating surface formed with a plurality of holes. Accordingly, the projections are pushed through the holes, pushing portions of garlic through the holes.

In one example, the projections are provided on a plate that is positioned within the cavity. In one example, the protrusion plate is pivotally attached to the handles and is configured to rotate upward with the piston after an initial amount of rotational travel of the piston out of the cavity.

In one example, the piston includes an upper cavity shaped to receive and retain garlic passing from the hopper into the cavity as the garlic is pressed. In one example, the handle comprising the piston further includes a scraper mounted for movement into and out of the hopper. Wherein the scraper is sized and configured to scrape along a lower surface of the cavity, abutting the plurality of holes that receive the projections. In one specific example, the scraper is formed with a concave shape suitable for holding a volume of the crushed garlic.

BRIEF DESCRIPTION OF THE SEVERAL VIEWS OF THE DRAWINGS

Preferred and alternative examples of the present invention are described in detail below with reference to the following drawings.

DETAILED DESCRIPTION OF THE DISCLOSURE

Figure 1:
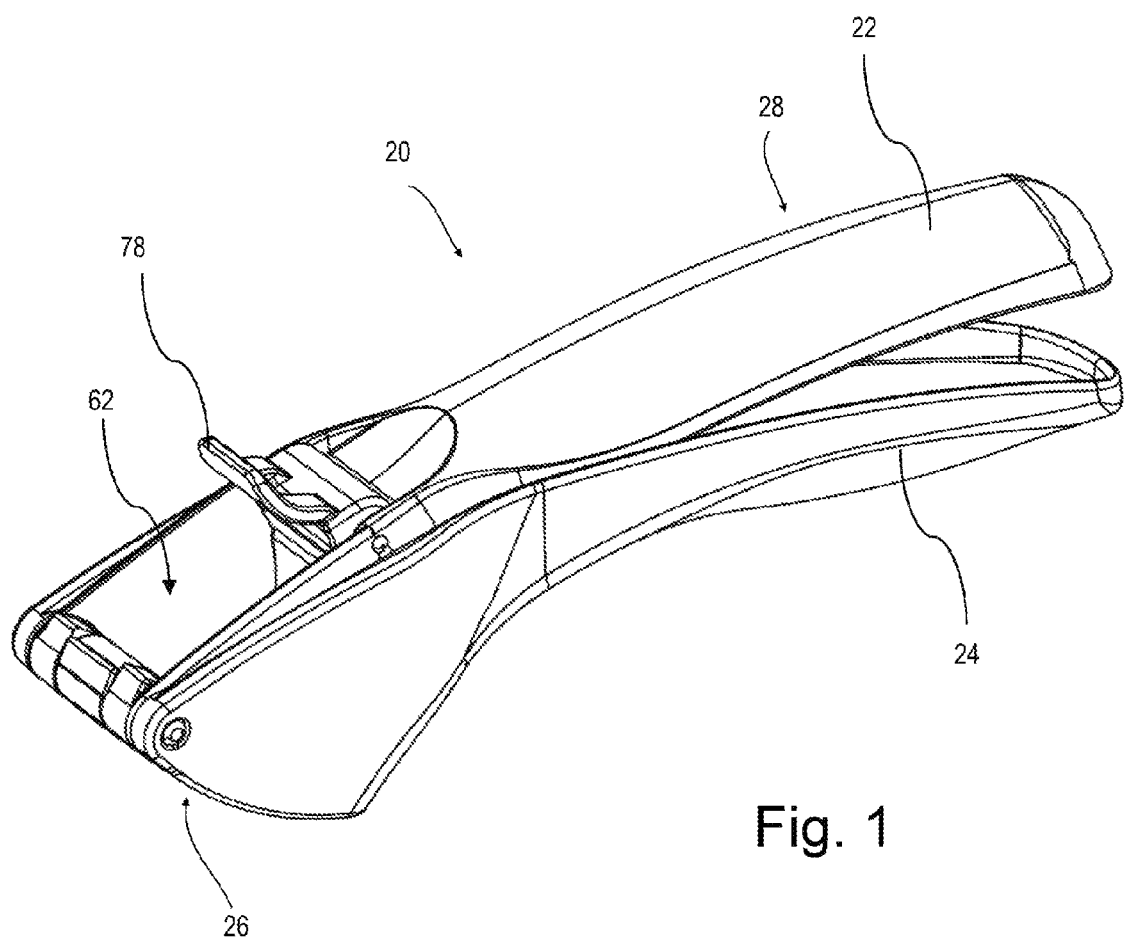
FIG. 1 is a top perspective view of a preferred garlic press, shown with a pair of handles rotated together in a closed position.
Figure 2:
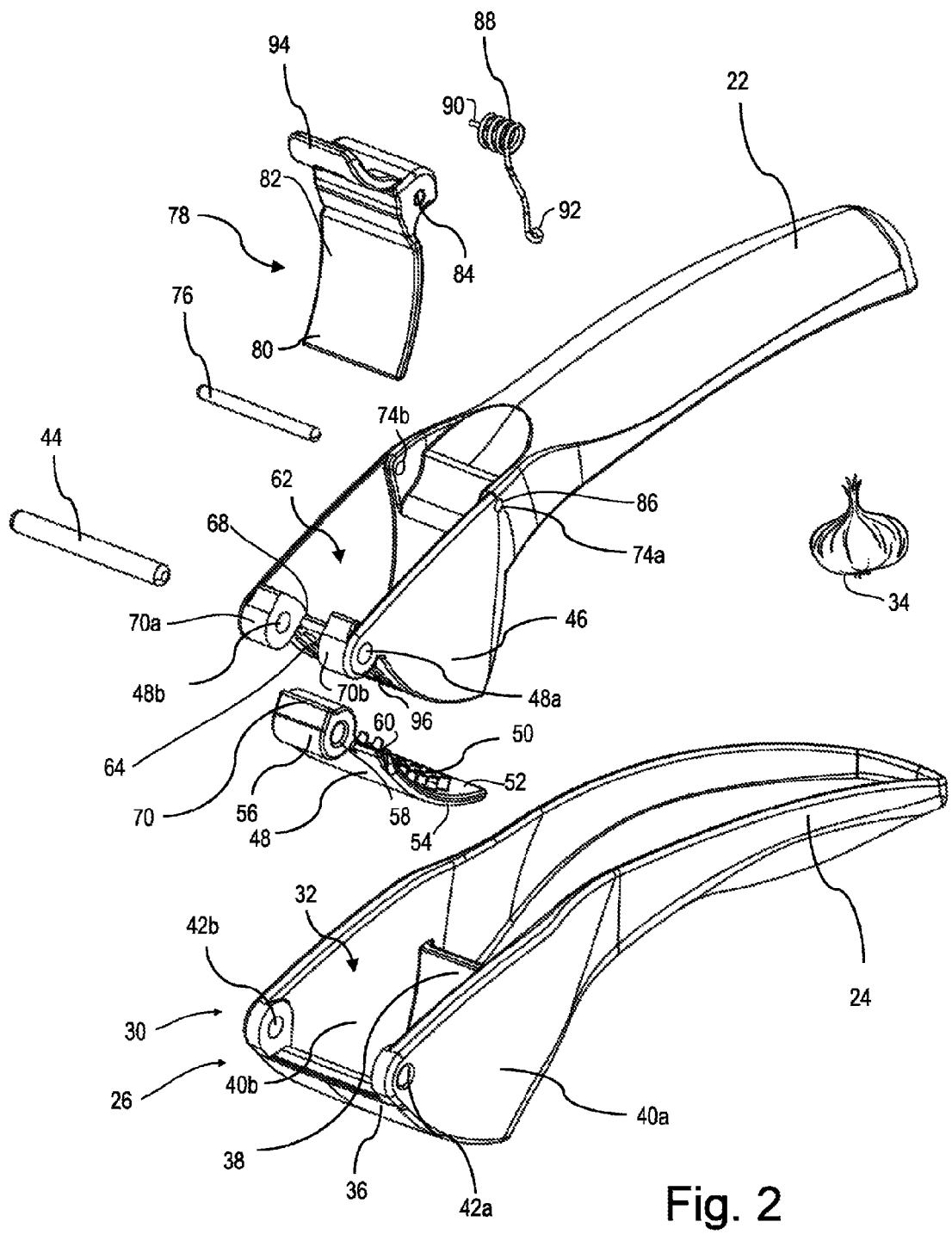
FIG. 2 is a front perspective exploded view of a preferred garlic press.
Figure 3:
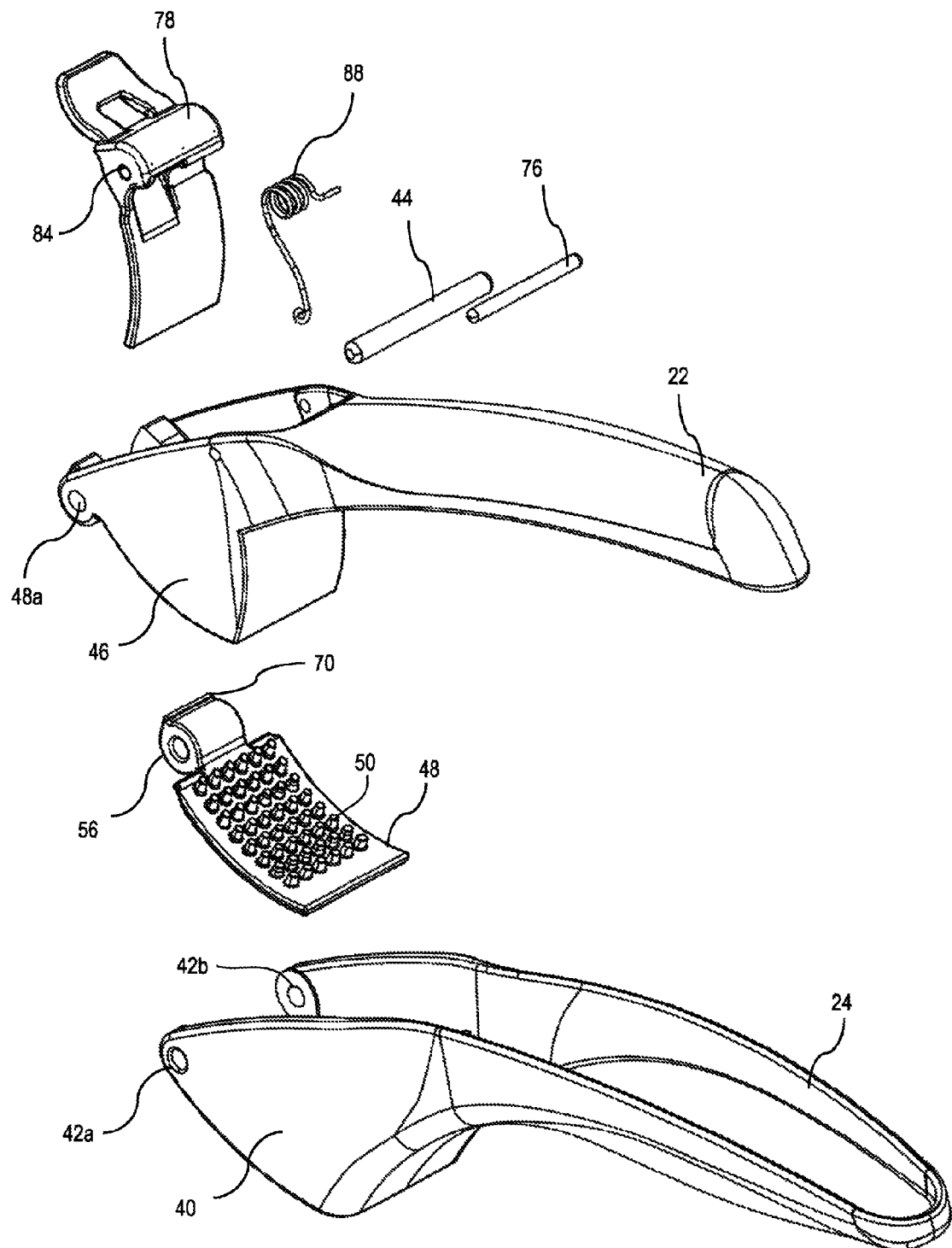
FIG. 3 is a back perspective exploded view of a garlic press.

A preferred garlic press 20 is shown in perspective view in FIG. 1. In the illustrated example, the garlic press includes a first (piston) handle 22 and a second (hopper) handle 24 pivotally attached to one another at a pivot end 26. The pivot point is located generally at one longitudinal or pivot end 26 of the garlic press 20, opposite the grasping end 28 of the handles 22/24. In one example, each of the two handles 22/24 is formed from metal such as steel, although other materials may be used.

The hopper handle 24 is configured with a working portion 30 having a hopper 32 arranged to receive one or more cloves of garlic 34 (or other crushable items) to be pressed. The hopper 32 is bounded by a front wall 36, a back wall 38, and a pair of opposing sidewalls 40a, 40b. Surfaces defining an aligned pair of pivot holes 42a, 42b may be formed in the opposing sidewalls, 40a/40b preferably at a location adjacent the upper end of the front wall 36 to receive a pivot axle 44 for connection of the hopper handle 24 to the piston handle 22 for a pivotal connection between the two handles 22/24. In the illustrated example, the holes 42 are surrounded by bosses (protuberances) formed to strengthen the area surrounding the holes 42.

The piston handle 22 is configured with a working portion 30 forming a piston 46 sized to be received within the hopper 32. One or more bosses are formed at an outer end of the piston handle 22, each of the bosses having a surface defining a hole 48a, 48b for receiving the axle 24 to join the piston and hopper handles 22/24 together.

A protrusion plate 48 is formed with a plurality of protrusions 50 extending upward from a protrusion side 52 of the protrusion plate 48, and is configured such that the opposite side 54 of the protrusion plate has a shape that fits within and substantially conforms to the bottom of the hopper 32, lying atop the interior surface of the front wall 36. One edge of the protrusion plate 48 is formed with a boss 56 having a surface defining a central bore 58 to enable the boss 56 to receive the axle 24 in order to mount the boss 56, and the protrusion plate 48, to the axle 44 which also joins the piston handle 22 to the hopper handle 24. Most preferably, the protrusion plate boss 56 is centrally located along the edge 60 of the protrusion plate 48 such that the protrusion plate boss 56 is received between the pair of bosses forming the holes 48a, 48b for mounting the protrusion plate 48 to the piston handle via the mounting the axle 44.

The piston 46 of one example is formed with an upper interior cavity 62 defining an interior space for receiving crushable items such as cloves (bits) of crushed garlic 34, as described further below. A front wall 64 of the piston is further formed with a plurality of holes (perforations) 96 that are sized and configured to receive the protrusions 50 formed in the protrusion plate 48.

The front wall 64 of the piston 46 terminates at an upper rim 68 that is recessed below each of the bosses formed in the first handle 22. The protrusion plate boss 56 of one example is formed with a ridge 70 extending horizontally along an outer surface of the boss 56, parallel to the direction of the bore 58 extending through the boss 56, and the ridge 70 having a radial length allowing the ridge 70 to engage the upper rim 68 of the front wall 64 of the piston. At a defined amount of rotation of the first handle 22 and piston 46 with respect to the second handle 24, the upper rim 68 will engage the ridge 70, thereby causing the protrusion plate 48 to rotate with the piston handle 22.

An upper portion of the cavity 62 in one example further includes surfaces defining an opposing pair of recesses or holes 74a/74b formed to receive a pin 76 which carries a scraper 78. The scraper includes a tongue 80 which in one example is formed with a concave shape to hold a volume of pressed garlic 34 within the concavity 82, as described below. A surface or surfaces defining central bore 84 is formed on the scraper 78 in order to receive the pin 76 so that the scraper 78 is pivotally mounted to the piton handle 22 at a position 86 adjacent where the hopper handle 24 joins the piston handle 22. A spring 88, in one example a coil spring, is coupled via the pin 76 to the piston handle 22 and includes a first terminal end 90 joined to the scraper 78 and a second terminal end 92 attached to or pressing against a portion of the piston handle 22 in order to bias the scraper 78 to a retracted position such as the position depicted in FIG. 1. A trigger portion 94 extends from the tongue 80 such that the tongue 80 and trigger portion 94 lie on opposite sides of the pin 76 when the scraper 78 is attached, thereby allowing a force applied to the trigger portion 94 to cause the rotation of the scraper 78 about the pin 76. Most preferably, the trigger portion 94 of the scraper 78 is configured to be operable by a thumb of a user when holding the piston handle 22 in a hand of the user.

Figure 9:
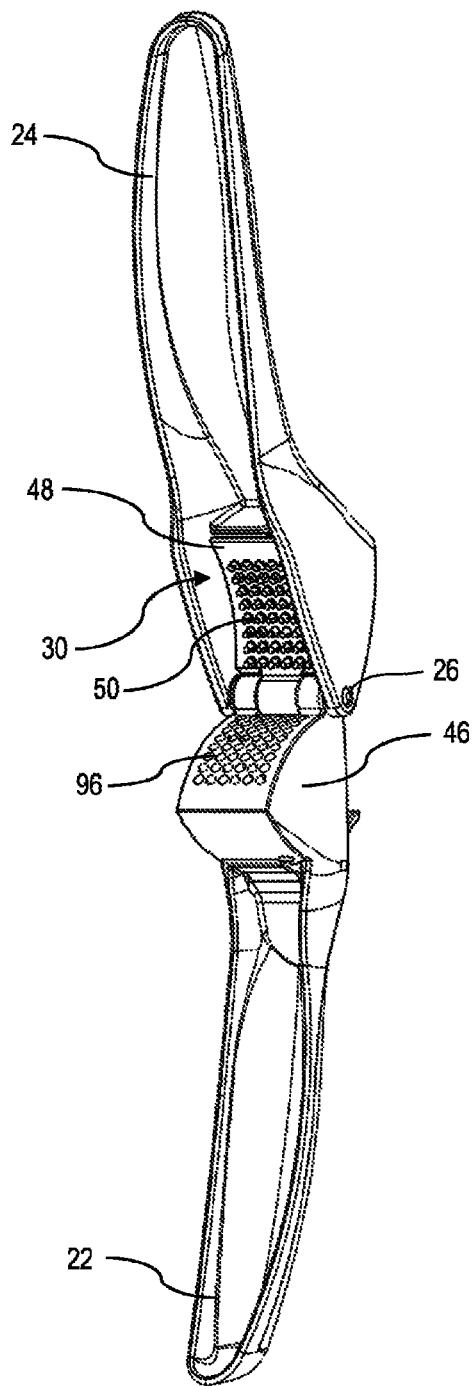
FIG. 9 is a top perspective view of a garlic press shown with a pair of handles rotated to an open position.

In operation, the piston and hopper handles 22/24 may be pivoted another around pivot point 26, into a position as shown in FIG. 9. In this position, the protrusion plate 48 is upward from the bottom of the hopper 32, rotated slightly away from the front wall 36 of the hopper 32, as the upper rim 68 of the front wall 64 of the piston 46 has engaged the ridge 70 formed on the boss 56 of the protrusion plate 48. This structural engagement causes the protrusion plate 48 to rotate with the piston handle 22, upward from the bottom of the hopper 32. In this position, the protrusion plate 48 is more accessible for cleaning, where a brush or similar tool can scrape any remaining bits of garlic 34, or other crushed material from the protrusion plate 48.

Figure 10:
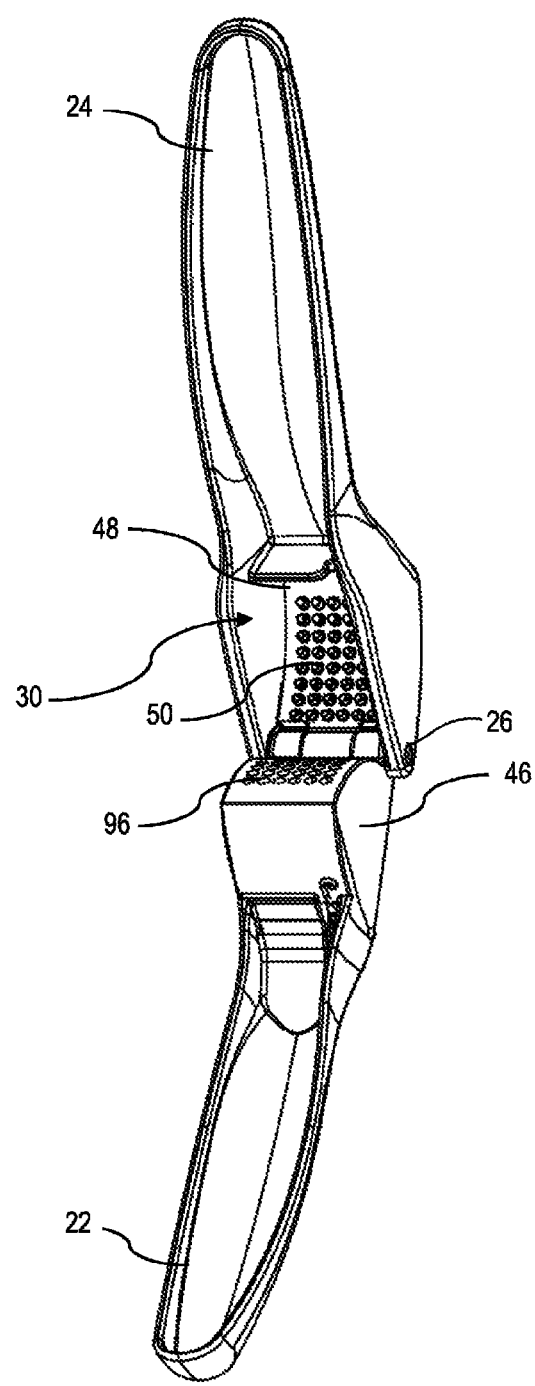
FIG. 10 is a top perspective view of a garlic press shown with a pair of handles rotated to an intermediate position, between a fully open position and a fully closed position.
Figure 11:
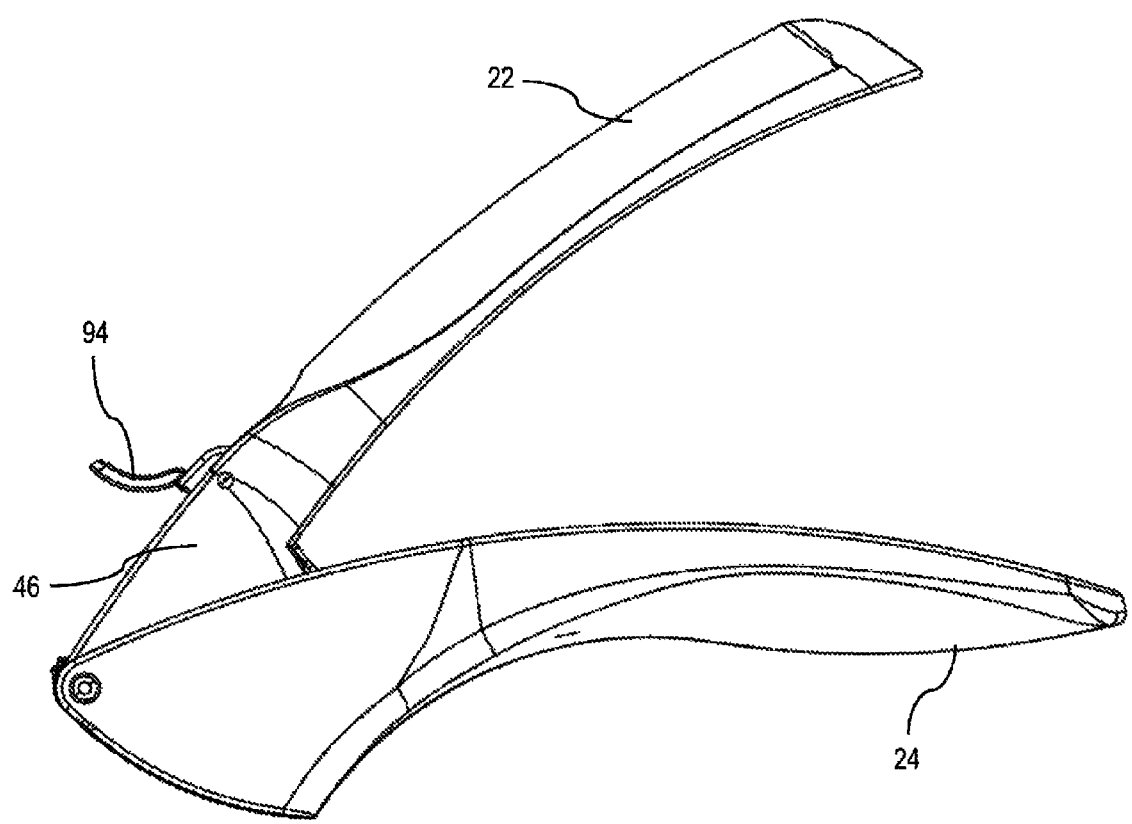
FIG. 11 is a front view of a garlic press shown with the handles rotated to a partially closed position.

At the time of initial use, one or more garlic cloves 34 are placed on the protrusion plate and then the handles 22/24 are rotated toward one another. After an initial amount of pivotal travel of the piston handle 22 with respect to the hopper handle 24, the protrusion plate 48 rotates downward to the bottom of the hopper 32. Thus, as shown in FIG. 10, after an initial rotation in which the handles 22/24 remain open at an angle of between about 90° and 135°, the protrusion plate 48 will have rotated downward to about the bottom of the hopper 32. Thus, as shown in FIG. 9 the handles 22/24 are rotated to a fully open position of 180 degrees, while in FIG. 10 the handles 22/24 are rotated toward a closed position as described above. In FIG. 9 the protrusion plate is rotated upward, while in FIG. 10 the protrusion plate is rotated downward to the bottom of the hopper 32.

As the piston handle 22 continues to rotate toward the hopper handle 24 and into a closed position (FIG. 1) of the two handles 22/24, the piston 46 is moved into the hopper 32. As described above, the piston 46 includes surfaces defining a plurality of holes 96, and when the bottom surface of the piston 46 engages the cloves of garlic 34 within the hopper 32, bits of garlic 34 are forced through the holes 96 and into the upper cavity 62 formed in the piston 46. After nearing the maximum amount of rotation of the handles 22/24 to the closed position (FIG. 1) the Protrusions are pushed into the holes 96 to force remaining bits of garlic 34 through the holes.

Figure 4:
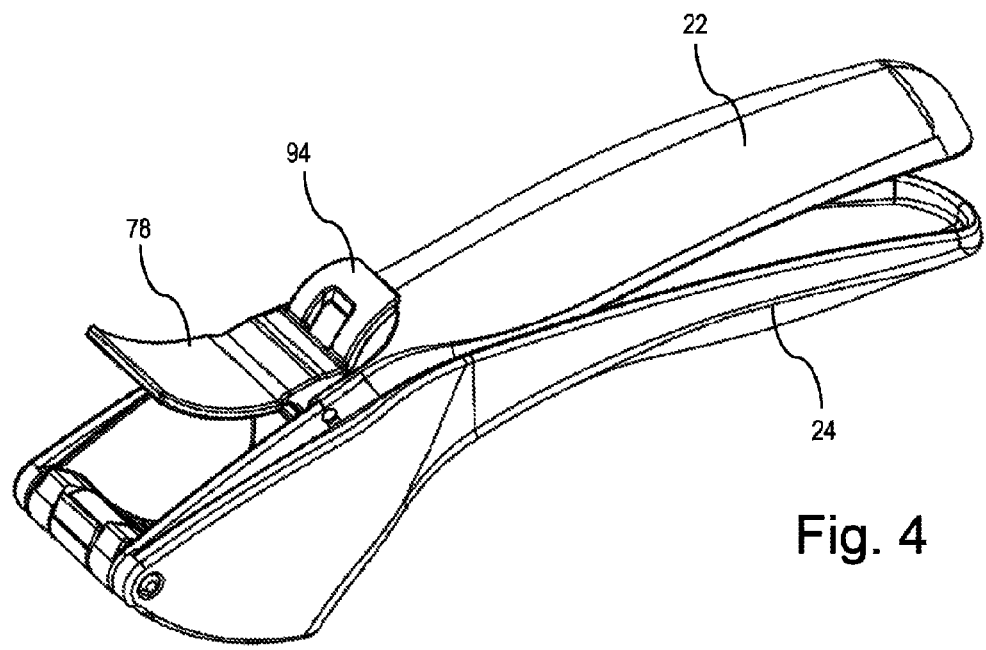
FIG. 4 is a top perspective view of a preferred garlic press, shown with a scraper rotated upward.
Figure 5:
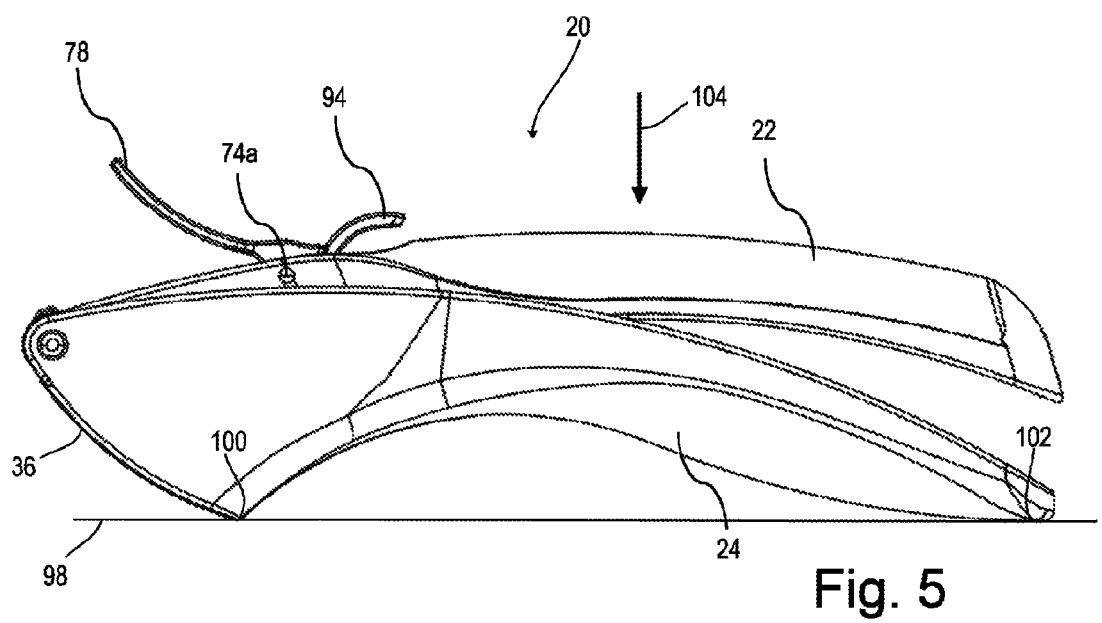
FIG. 5 is a front plan view of the garlic press as shown in FIG. 4.
Figure 6:
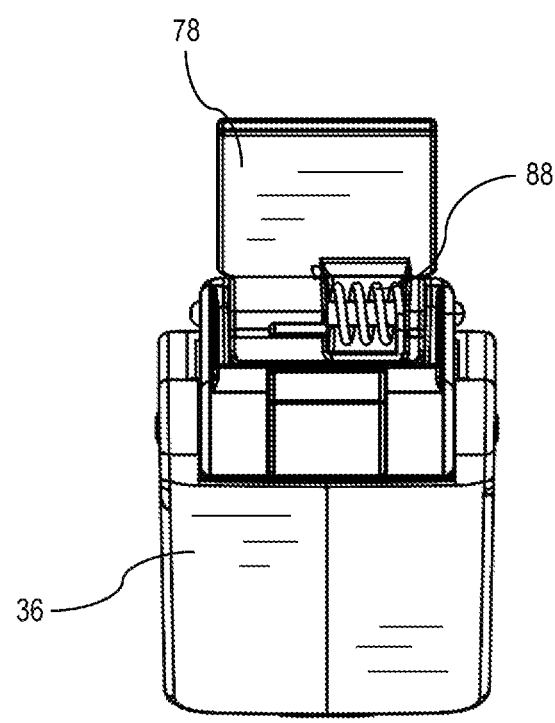
FIG. 6 is a left side view of the garlic press as shown in FIG. 4.
Figure 7:
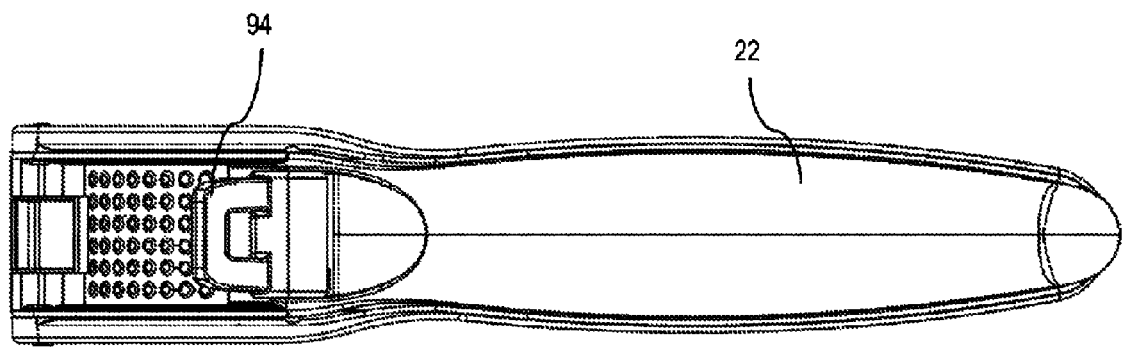
FIG. 7 is a top view of the garlic press as shown in the position of FIG. 1.
Figure 8:
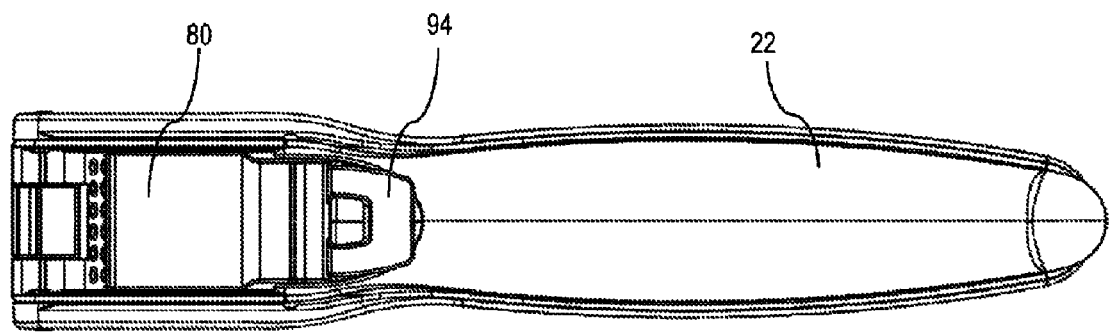
FIG. 8 is a top plan view of the garlic press as shown in the position of FIG. 4

After the garlic cloves 34 have been pressed as described above, the pressed garlic 34 will be contained within the cavity 62 in the piston 46. At this point a user may operate the scraper 78 to scrape and remove the pressed garlic 34 from the cavity 62. Thus, the trigger 94 of the scraper 78 is rotated, in a direction from the cavity 62 toward the pivot end 26 of the piston handle, to cause the tongue 80 of the scraper 78 to pass across the floor (inner surface of front wall 64) of the cavity 62. This process scrapes any remaining garlic 34 or other crushed material from within the cavity 62 and captures this garlic 34 within the concave 82 shape of the scraper 78. At the same time, the rotation of the scraper 78 brings the garlic 34 upward from the bottom of the cavity 62 to a position where it can be easily retrieved by a user. FIGS. 4-6 show the scraper 78 in a fully deployed position, extending out of the cavity 62. Likewise, FIG. 8 shows the scraper 78 in a deployed position while FIG. 7 shows the scraper in a retracted position.

Looking to FIG. 5 it can be seen that the garlic press 20 rests upon a work surface 98 such as a countertop or tabletop. In this position, the press rests upon the lower edge 100 of the front wall 36 and optionally on the lower side 102 of the hoper handle 24 at the grasping end. In this position a user may press downward 104 on the piston handle 22 against the work surface 89. The piston handle will rotate towards the work surface 89 as the garlic 34 or other crushed material is pressed through the holes 96 into the cavity 62. Once complete the apparatus may be lifted and the pressed garlic 34 removed as disclosed above.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A garlic press comprising:
   a piston handle having a grasping end and a pivot end;
   the piston handle having a front wall at the pivot end with surfaces defining holes there through;
   the front wall of the piston handle cooperating with laterally opposed sidewalls and a back wall of the piston handle to form a receiving cavity;
   a hopper handle having a grasping end and a pivot end pivotably connected to the pivot end of the piston handle;
   a front wall of the hopper handle cooperating with laterally opposed sidewalls and a back wall of the hopper handle to form a hopper;

wherein the receiving cavity fits within the hopper as the piston handle is pivoted toward the hopper handle;

wherein as the piston handle is pivoted toward the hopper handle, items crushed between the front wall of the piston handle and front wall of the hopper handle are forced through the surfaces defining holes in the front wall of the piston handle into the receiving cavity of the piston handle;

a protrusion plate pivotably coupled to the hopper handle;

the protrusion plate having a first side conforming to the inner surface of the front wall of the hopper handle;

the protrusion plate having a second side conforming to the outer surface of the front wall of the piston handle; and the protrusion plate having protrusions extending from the second side into the surfaces defining holes through the front wall of the piston handle.

2. The garlic press as recited in claim 1 further comprising a ridge on the protrusion plate in intermediate contact with the piston handle configured to rotate the protrusion plate upward with the piston handle after an initial amount of rotational travel of the receiving cavity out of the hopper.

3. A garlic press comprising:

a piston handle having a grasping end and a pivot end;

the piston handle having a front wall at the pivot end with surfaces defining holes there through;

the front wall of the piston handle cooperating with laterally opposed sidewalls and a back wall of the piston handle to form a receiving cavity;

a hopper handle having a grasping end and a pivot end pivotably connected to the pivot end of the piston handle;

a front wall of the hopper handle cooperating with laterally opposed sidewalls and a back wall of the hopper handle to form a hopper;

wherein the receiving cavity fits within the hopper as the piston handle is pivoted toward the hopper handle; and wherein as the piston handle is pivoted toward the hopper handle, items crushed between the front wall of the piston handle and front wall of the hopper handle are forced through the surfaces defining holes in the front wall of the piston handle into the receiving cavity of the piston handle;

a scraper having a first end pivotably mounted at a pivot axis to the piston handle adjacent the rear wall of the receiving cavity, with a second end in moving contact with the inner surface of the front wall of the receiving cavity; and wherein the inner surface of the front wall of the cavity is frusta-cylindrical, having a radius centered upon the pivot axis of the scraper.

4. The garlic press as recited in claim 3 wherein the scraper further comprises:

a trigger portion on the opposing side of the pivot axis from the second end; and wherein the trigger portion extends outward of the receiving cavity.

* * * * *